United States Patent [19]

Barabash et al.

[11] Patent Number: 5,640,417

[45] Date of Patent: Jun. 17, 1997

[54] QAM DETECTOR WHICH COMPENSATES FOR RECEIVED SYMBOL DISTORTION INDUCED BY A CELLULAR BASE STATION

[75] Inventors: Darrell W. Barabash; Alan D. McGrath; John G. McRory, all of Calgary, Canada

[73] Assignee: Harris Canada, Inc., Canada

[21] Appl. No.: 506,259

[22] Filed: Jul. 24, 1995

Related U.S. Application Data

[63] Continuation of Ser. No. 238,209, May 4, 1994, abandoned, which is a continuation of Ser. No. 771,458, Oct. 4, 1991, abandoned.

[51] Int. Cl.$^6$ ............................................. H04B 1/38
[52] U.S. Cl. ..................... 375/222; 375/261; 375/324; 375/340; 379/98; 329/304
[58] Field of Search ........................... 379/56, 58, 59, 379/98; 375/222, 223, 261, 308, 324, 329, 340, 346; 329/304; 380/39; 370/84

[56] References Cited

U.S. PATENT DOCUMENTS

| | | | |
|---|---|---|---|
| 3,878,468 | 4/1975 | Falconer et al. | 325/320 |
| 4,679,227 | 7/1987 | Hughes-Hartogs | 379/98 |
| 4,697,281 | 9/1987 | O'Sullivan | 379/59 |
| 4,731,816 | 3/1988 | Hughes-Hartogs | 379/98 |
| 4,811,363 | 3/1989 | Hoffmann | 375/83 |
| 4,837,800 | 6/1989 | Freeburg et al. | 379/59 |
| 4,849,996 | 7/1989 | Kamerman | 375/118 |
| 4,912,728 | 3/1990 | Deguchi | 375/39 |
| 4,912,756 | 3/1990 | Hop | 379/58 |
| 4,984,219 | 1/1991 | Brown et al. | 380/39 |
| 4,991,197 | 2/1991 | Morris | 379/58 |
| 5,020,090 | 5/1991 | Morris | 379/58 |
| 5,103,459 | 4/1992 | Gilhousen et al. | 375/1 |
| 5,128,934 | 7/1992 | Jasuski | 370/84 |
| 5,157,693 | 10/1992 | Lemersal, Jr. et al. | 375/67 |
| 5,265,151 | 11/1993 | Goldstein | 379/98 X |
| 5,535,244 | 7/1996 | Nakatsu et al. | 375/261 |

OTHER PUBLICATIONS

Patrick Dryden, "PCs Phone Home: Cellular, Radio Links", Feb. 19, 1990 pp. 31 and 39.
Narayan, McLane, "Fractionally Spared Equalization for Analog Cellular Data Modems", IEEE, May 9, 1991.
Webb, "QAM: the Modulation Scheme for Future Mobile Radio Communications", Electronics & Communication Engineering Journal, Aug. 1992.
Taub & Schilling, "Principles of Communication Systems" 1986, pp. 272–276.
Sampei, S., "Rayleigh Fading Compensation Method for 16QAM MODEN in Digital Land Mobile Radio Systems," *Electronics and Communications in Japan*, Part I, vol. 73, No. 2, 1990, pp. 99–108
Wood, S.L., Larimore, M.G. and Treichler, J.R., "Modem Constellation Identification: A Performance Comparison of Two Methods," *Institute of Electrical and Electronic Engineers*, 2847–2/90/0000–1651, 1990.
Liu, C. and Feher, K., "Performance of Non–Coherent π/4–QPSK in a Frequency–Selective Fast Rayleigh Fading Channel," *IEEE International Conference on Communication (ICC 1990)*, Part IV, Apr. 16–19,1990, pp. 1369–1373.
Journal, 1990 (Exact date unknown), p. B1.

*Primary Examiner*—Stephen Chin
*Assistant Examiner*—Amanda T. Le
*Attorney, Agent, or Firm*—Cesari and McKenna, LLP

[57] ABSTRACT

A cellular subscriber modem for receiving CCITT-type quadrature amplitude modulated (QAM) signals. The cellular modem includes a novel symbol detector that converts received symbol information to polar notation. The detector's constellation thresholds include a circular threshold having a radius greater than the magnitude of the innermost symbols, but less than the magnitude of the outermost symbols, and radially spaced thresholds, which further discriminate between the outermost symbols. As a result, special cellular-compatible modem equipment need not be connected between the public-access switched telephone network and the computer equipment at the other end, which means that a CCITT-compatible cellular subscriber modem can then be treated as any other type of CCITT-modem. The detector may be implemented in the software of a standard modem processor, or as several analog comparator circuits.

14 Claims, 11 Drawing Sheets

```
100  do while training_sequence = true
110  { read avg_level
120    x = function (avg_level) }
130  do while receiving_data = true
140  { read I,Q from
150    sample_phase = arctan (Q/I)
160    sample_amplitude = sqrt(I²+Q²)
170    if 0 < sample_phase ≤ 90° then quadrant = I
180    if 90° < sample_phase ≤ 180° then quadrant = II
190    if 180° < sample_phase ≤ 270° then quadrant = III
200    if 270° < sample_phase ≤ 360° then quadrant = IV
210    if quadrant = I
220       if sample_amplitude < x then receive_symbol = ①
230       else
240       { if sample_phase<31.7° then receive_symbol = ②
250         if 31.7°≤sample_phase<58.3° then receive_symbol=③
260         if 58.3°≤sample_phase<90° then receive_symbol=④ }
```

( TO STEP 270, FIG. 5b )

FIG. 5a (FROM 260, FIG. 5a)

270 if quadrant = II
280   if sample_amplitude < x then receive_symbol = ⑤
290   else
300     { if sample_phase<121.7° then receive_symbol = ⑥
310       if 121.7°≤sample_phase<148.3° then receive_symbol=⑦
320       if 148.3°≤sample_phase<180° then receive_symbol=⑧ }
330 if quadrant = III
340   if sample_amplitude < x then receive_symbol = ⑨
350   else
360     { if sample_phase<211.7° then receive_symbol = ⑩
370       if 211.7°≤sample_phase<238.3° then receive_symbol=⑪
380       if 238.3°≤sample_phase<270° then receive_symbol= ⑫ }
390 if quadrant = IV
400   if sample_amplitude < x then receive_symbol = ⑬
410   else
420     { if sample_phase<301.7° then receive_symbol = ⑭
430       if 301.7°≤sample_phase<328.3° then receive_symbol= ⑮
440       if 328.3°≤sample_phase<360° then receive_symbol= ⑯ }
450 end

FIG. 5b

```
100  do while training_sequence = true
110  { read avg_level
120    x = function (avg_level) }
130  do while receiving_data = true
140  { read I,Q from
150    sample_phase = arctan (Q/I)
160    sample_amplitude = sqrt(I²+Q²)
170    if 0 < sample_phase ≤ 90° then quadrant = I
180    if 90° < sample_phase ≤ 180° then quadrant = II
190    if 180° < sample_phase ≤ 270° then quadrant = III
200    if 270° < sample_phase ≤ 360° then quadrant = IV
210    if quadrant = I
220      if sample_amplitude < x then receive_symbol = ①
230      else
240      { if sample_phase<31.7° then receive_symbol = ②
250        if 31.7°≤sample_phase<58.3° then receive_symbol=③
260        if 58.3°≤sample_phase<90° then receive_symbol=④ }
```

( TO STEP 270, FIG. 6b )

FIG. 6a (FROM 260, FIG. 6a)

270   if quadrant = II
280     if sample_amplitude < x then receive_symbol = ⑤
290     else
300       { if sample_phase<121.7° then receive_symbol = ⑥
310         if 121.7°≤sample_phase<148.3° then receive_symbol= ⑦
320         if 148.3°≤sample_phase<180° then receive_symbol= ⑧ }
330   if quadrant = III
340     if sample_amplitude < x then receive_symbol = ⑨
350     else
360       { if sample_phase<211.7° then receive_symbol = ⑩
370         if 211.7°≤sample_phase<238.3° then receive_symbol= ⑪
380         if 238.3°≤sample_phase<270° then receive_symbol= ⑫ }
390   if quadrant = IV
400     if sample_amplitude < x then receive_symbol = ⑬
410     else
420       { if sample_phase<301.7° then receive_symbol = ⑭
430         if 301.7°≤sample_phase<328.3° then receive_symbol= ⑮
440         if 328.3°≤sample_phase<360° then receive_symbol= ⑯ }
450   end

FIG 6b

QAM DETECTOR WHICH COMPENSATES FOR RECEIVED SYMBOL DISTORTION INDUCED BY A CELLULAR BASE STATION

This is a continuation of application Ser. No. 08/238,209 filed on May 04, 1994, now abandoned, which is a continuation of application Ser. No. 07/771,458 filed on Oct. 4, 1991, now abandoned, assigned to NovAtel Communications Ltd.

FIELD OF THE INVENTION

This invention relates generally to data communications, and particularly to detecting quadrature amplitude modulated (QAM) signals, such as those produced by a high-speed data modem, after such signals have been transmitted over a cellular telephone network.

BACKGROUND OF THE INVENTION

The widespread availability of low-cost portable computer equipment has meant that more and more people use computers away from a fixed location. With the equally prolific availability of low-cost cellular telephones, sophisticated portable computer users now demand the same type of data transmission services, using the cellular telephone network, which are presently widely available using the landline public-access switched telephone network (PSTN).

Unfortunately, it has not been generally possible to directly connect the most popular type of high-speed modems to standard voice-grade cellular telephone lines. In particular, certain specifications such as the V.22bis and V.42bis standards of the Consultative Committee on International Telegraph and Telephone (CCITT) permit high-speed data transfer at 2400 and 9600 bits per second. These CCITT-compatible modems are gaining widespread acceptance among the computing community in both North America and Europe, since they do not use more than 3 kilohertz (kHz) or so of bandwidth, and thus do not require special telephone land lines. This means that a fixed-location computer user may simply purchase a CCITT-compatible modem, connect it to a standard telephone land line, and begin to transmit and receive data at high speeds, without first requesting a special type of line from the local telephone company.

However, CCITT-compatible modems cannot presently be reliably connected to standard voice-grade cellular telephone equipment. When such an attempt is made, severe and unpredictable distortion and concomitant loss in signal quality may occur, because the signalling requirements of present cellular systems are incompatible with CCITT signalling requirements.

As such, in order to reliably provide CCITT-compatible modem signalling over a cellular network, cellular modems are presently sold in matched pairs. One modem serves as a cellular subscriber unit and is connected to the portable computer; the second modem must be used to connect the fixed-location computer to the land-based PSTN. The matched second modem serves to recondition the CCITT-format signals received from the fixed-location computer to insure compatibility with cellular signalling requirements.

Thus, in order to reliably connect a CCITT-compatible modem to the cellular network, arrangements must be made in advance to insure that the computer equipment at both ends have a cellular-compatible modem. This, in turn, not only complicates the transmission of data over the cellular network, but also limits the user of the portable computer, who can only communicate with other computers that have cellular-compatible modems.

What is needed is a way to allow a cellular subscriber modem to be connected to the cellular network as easily as a land-based modem can be connected to the PSTN, that is, without requiring prior intervention to insure that the land-based modem on the other side of the PSTN is cellular-compatible.

As a result, by eliminating the need to connect cellular modems in pairs, a cellular subscriber modem could then be treated as any other type of modem. Assuming arrangements have been made for cellular voice service, the user could simply connect such a cellular modem connected to a portable computer and then begin to reliably transmit and receive data at high speeds.

The implementation of such a cellular modem should avoid the need for specialized hardware as much as possible, so that existing cellular telephone and modem integrated circuit (IC) chips may be used.

SUMMARY OF THE INVENTION

The invention is a cellular subscriber modem which compensates for cellular base station-induced symbol distortion in standard CCITT-format signals as provided over a public switched telephone network (PSTN). The cellular base station can thus be connected, through the PSTN, to any type of CCITT-compatible modem, thereby eliminating the need to install modems in matched pairs.

This, in turn, means that a portable computer user desiring high-speed data transmission services need not make special arrangements in advance.

More particularly, the invention is a cellular modem that includes a Euclidian-distance, quadrature amplitude modulated (QAM) symbol detector. The modem develops in-phase ($i$) and quadrature ($q$) signal samples, as in any QAM modem. However, before symbol detection, the $i$ and $q$ samples are converted from rectangular (Cartesian) notation to polar notation, to yield a magnitude and phase for each signal sample. This enables the symbol detector to determine the symbol currently being received by comparing sample magnitude and phase information against optimized magnitude and phase constellation thresholds. The constellation thresholds are placed so that they maximize the probability of a correct symbol detection, by equalizing the Euclidian distance between a radial threshold and adjacent symbols.

The effects of any symbol magnitude distortion imposed by the cellular base station are thus minimized, so that a special cellular-compatible modem need not be connected to the land-based computer equipment as well.

The invention may be implemented as a software program in a digital signal processor which is commonly included as part of a standard cellular and/or modem integrated circuit chip set. The software compares sample phase information against phase thresholds to determine a constellation quadrant. Next, the magnitude information is compared against a magnitude threshold to determine which of the symbols within a quadrant is being sent. For example, if the magnitude is less than a certain amount, it is concluded that an innermost symbol is being sent. If the magnitude exceeds this threshold, then the phase information is again examined to determine which of several outermost constellation symbols is being received.

The magnitude threshold may be adjusted automatically as the amount of symbol distortion changes. That is, a received symbol magnitude distribution is preferably estimated at the beginning of a call, such as by determining an average and a variance of an expected received symbol magnitude. This magnitude distribution estimate is then used to set the magnitude threshold. As the received symbol magnitude estimate changes in value, the magnitude threshold is correspondingly changed, to maximize the probability of correct detection.

The invention may also be implemented using analog comparator circuits arranged to perform the constellation threshold comparisons on analog voltages that represent the amplitude and phase information for each symbol.

While the invention does cause an approximately 1.5 decibel (dB) signal to noise degradation when the incoming QAM signal is not distorted by the base station, a vast improvement is observed when such distortion does occur. In applications where this slight performance degradation is of concern, the Cartesian or Euclidian detection method can be selectively used, depending upon the estimated level of received symbol distortion.

Although the invention is described in detail in connection with the popular sixteen-symbol QAM signalling format specified by CCITT V.22bis, it works equally well with certain other two-dimensional signalling schemes wherein sample magnitudes may be clipped by intervening transmission equipment.

There are many advantages to the invention. It makes the cellular network entirely transparent to the modem user, so that a standard voice-grade cellular telephone line may be used for high-speed data transfer. Such a user needs only to arrange for standard voice-grade cellular service, and then connect his cellular subscriber modem to his computer equipment. No special arrangements need to be made to insure that the computer equipment on the other end of the telephone connection has a cellular-compatible modem attached thereto.

The invention may be implemented using existing cellular telephone and modem integrated circuit hardware, by simply modifying the software associated with a digital signal processor.

BRIEF DESCRIPTION OF THE DRAWINGS

The novel features believed to be characteristic of the invention are set forth in the appended claims. The best mode for carrying out the invention and its particular features and advantages can be better understood by referring to the following detailed description, read together with the accompanying drawings, in which:

FIGS. 6A and 6B depict software operations which perform symbol detection according to the invention;

DETAILED DESCRIPTION OF ILLUSTRATIVE EMBODIMENTS

Figure 1:
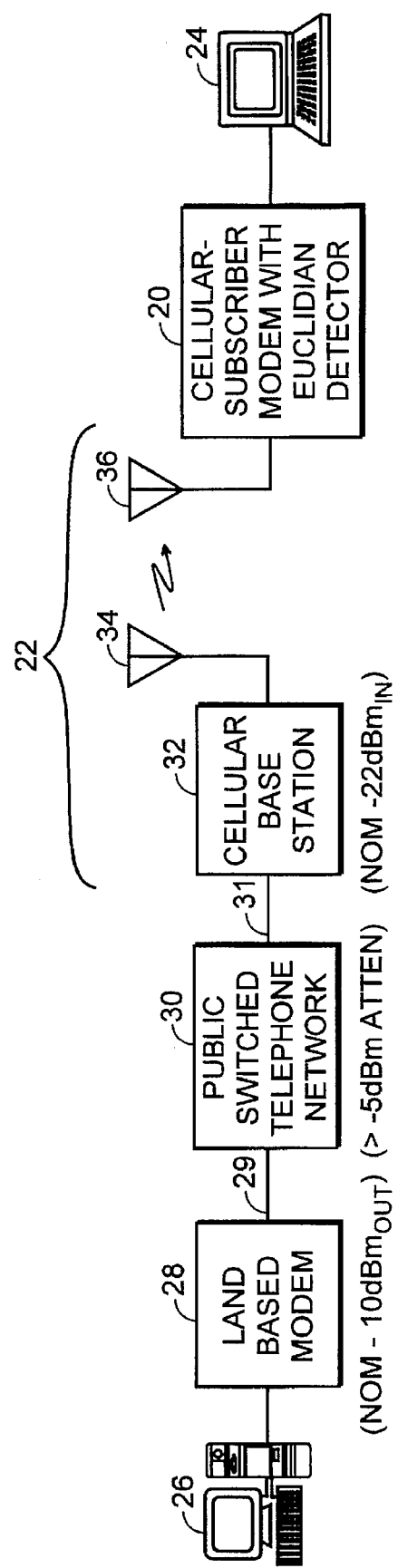
FIG. 1 is a block diagram showing a cellular modem having a Euclidian distance detector according to the invention, and the manner in which the detector is interconnected to a land-based modem via the public switched telephone network (PSTN), which is in turn, directly connected to a standard cellular base station.

Turning attention to the drawings, FIG. 1 shows a cellular subscriber modem 20 according to the invention and its use with a cellular telephone network 22 to provide CCITT V.22bis-compatible data transmission service between a portable computer 24 and a fixed-location computer 26.

The cellular network 22 includes a conventional cellular base station 32, a base station antenna 34, and a mobile antenna 36. The mobile antenna 36 is typically integrally packaged with the cellular modem 20, in much the same manner as a standard cellular subscriber portable telephone and antenna are sold as a unit.

The fixed-location computer 26 is connected via a land-based modem 28 to a public-access switched telephone network (PSTN) 30, which in turn, provides access to the cellular network 22. Unlike prior similar arrangements, the fixed-location computer 26 is directly connected to the PSTN 30 using only a standard land-based modem 28, and not a special cellular-compatible modem which must be paired with the cellular modem 20. As such, the user of the portable computer 24 need not make special arrangements with the user of the cellular network 22 or the operator of the fixed-location computer 26 before reliably operating the cellular modem 20.

Although the portable computer 24 is depicted as a laptop computer, it should be understood that any type of computer or data communications equipment, such as a workstation, minicomputer, mainframe computer, local area network (LAN) gateway, or telemetry equipment may be connected to take advantage of the cellular modem 20, especially if such equipment is located in a remote geographic area where land-line telephone service is not readily available. Similarly, the fixed-location computer 26 may be any type of computer or data communications equipment.

In operation, data signals originating from the computer 26 are provided to the modem 28 in a conventional manner, via either a standard bit-serial or bit-parallel interface. The modem 28 encodes and then modulates the data signals into one of the well-known standard formats for data transmission, such as the CCITT V.22bis format.

The CCITT V.22bis standard permits transmission of data at 2400 bits per second using a 16-symbol quadrature amplitude modulation (16-QAM) signalling scheme. The resulting modulated signal occupies a frequency band from about 600 Hertz (Hz) to 3000 kHz, which is well within the limitations of a voice-grade telephone circuit. As such, a standard voice-grade telephone line 29 may be used to forward the modulated signal to the PSTN 30.

Other standards, such as the CCITT V.42bis, use the same signalling scheme together with data compression to provide 9600 bits per second service over the voice-grade line 29.

The PSTN 30 then forwards the 16-QAM formatted signal to the cellular base station 32 using another voice-grade telephone line 31. The base station 32 then radio frequency (RF) modulates the 16-QAM signal and transmits it over the air via the base station antenna 34 to the mobile antenna 36. The cellular modem 20 demodulates the received RF signal and decodes it into a bit-serial or bit-parallel format compatible with the portable computer 24 data input port.

As will be understood shortly, the 16-QAM signal may be severely distorted when a standard land-based modem 28 is directly connected to the cellular base station 32 via the PSTN 30; however, the cellular modem 20 corrects for this distortion. Because this distortion is inherent in a properly functioning CCITT-compatible modem 28 and base station 32, the cellular modem 20 cannot absolutely correct the received signal. However, we have discovered that it is possible to largely eliminate the effect of this distortion by using a modified symbol detector in the receiver portion of the cellular modem 20. Thus, with the novel detection scheme employed by the cellular modem 20, even a signal that has been distorted by the base station 32 may be properly reconstructed by the cellular modem 20. As a result, matched, cellular-compatible modem equipment need not be installed between the PSTN 30 and the computer 26.

The distortion imposed by this arrangement of standard modem 28, PSTN 30 and cellular base station 32 is principally the result of an incompatibility in specified signal power levels. In particular, the nominal signal level output by the V.22bis modem 28 is greater than the nominal input level of a standard North American cellular base station 32. This situation is further exacerbated by the unpredictability of the attenuation presented by the PSTN 30.

Specifically, a standard CCITT-compatible modem 28 provides a nominal output signal power of about −10 dBm (decibels with respect to a milliwatt); however, this may be significantly different. The cellular base station 32 normally expects an input signal level as received from the PSTN 30 to be about −22 dBm. From the point of view of the base station 32, then, the PSTN 30 thus ideally provides about 12 dB of attenuation.

However, in practice, the amount of attenuation introduced by the PSTN 30 cannot at all be guaranteed, since the amount of attenuation presented by the PSTN 30 depends upon the number of telephone trunk circuits physically interposed between the modem 28 and the cellular base station 32. As such, the attenuation induced by the PSTN 30 can be as low as 5 dB, when the modem 28 and cellular base station 32 are connected to the same central office, but may be much higher, such as when many trunks are traversed.

Therefore, when this attenuation is less than 12 dB, or the output level of the modem 28 is greater than −10 dbm, the higher-magnitude 16-QAM symbols can be clipped. The resulting amplitude distortion causes the base station 32 to also limit the frequency modulation (FM) deviation in its transmitted RF output signal, which in turn, distorts the baseband signal received at the input of the cellular modem 20. Ironically, this means that the shortest path circuit through the PSTN 30 induces the greatest amount of distortion, and hence the largest increase in the bit error rate.

Figure 2A:
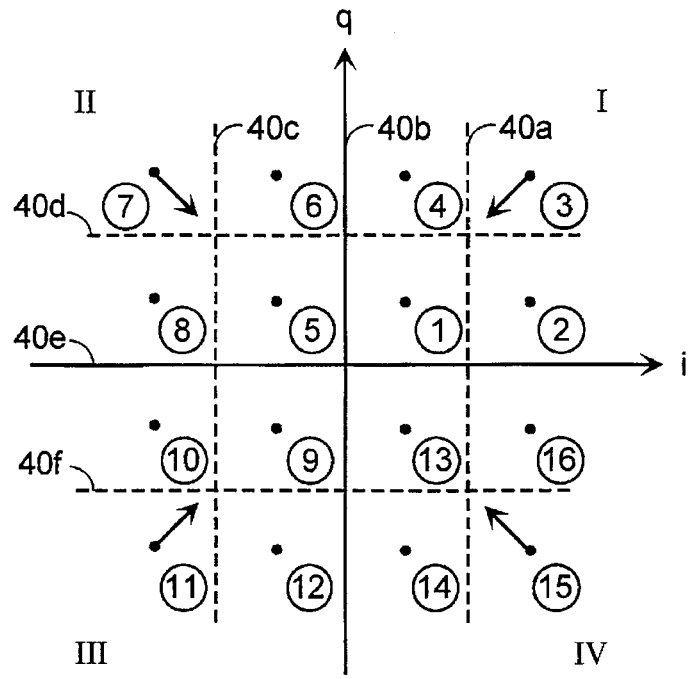
FIG. 2A is a constellation diagram showing the prior art orthogonal threshold detection scheme for reception of sixteen-symbol QAM signals.

To further understand the nature of this base-station induced distortion, refer to FIG. 2A, which shows the 16-QAM symbol constellation specified by CCITT V.22bis. The sixteen constellation symbols are indicated as black dots and have been assigned symbol numbers from {1} to {16}, as indicated by the encircled numerals. The constellation diagram of FIG. 2A is complex-valued, having each symbol's in-phase ($i$) information plotted on the horizontal axis versus its quadrature ($q$) information on the vertical axis. The sixteen constellation symbols are equally spaced about the $i$ and $q$ axes, with four symbols in each of the four quadrants I, II, III, and IV. For example, one of the sixteen symbols, namely symbol number {4}, is represented by a signal having a normalized ($i$,$q$) value of (1,3).

The prior art detection scheme employed by CCITT V.22bis modems orthogonally positions the constellation thresholds 40a–40f so that they are equally spaced along the $i$ and $q$ axes. This so-called orthogonal (or Cartesian) slicing detection method equalizes the area assigned to each symbol, and has thus been thought to maximize the probability of correct detection.

However, this prior art orthogonal slicing detector is optimum only in the absence of signal distortion. In particular, the effect of the distortion induced by the base station 32 is to reduce the amplitude of the symbols located the farthest away from a center point (0,0) of the constellation. That is, as indicated by the arrows A adjacent symbols {3}, {7}, {11}, and {15}, these highest energy, or "outermost" symbols tend to be pushed inwards towards the intersection of the $i$ and $q$ axes.

In an extreme case of signalling incompatibility, the other eight high energy symbols {2}, {4}, {6}, {8}, {10}, {12}, {14} and {16} will also be distorted, with the twelve outer symbols having equal energy, and forming a circle about the four innermost symbols {1}, {5}, {9}, and {13}. If standard orthogonal detection thresholds are used in this distorted symbol situation, the four outermost symbols eventually approach the inner corners of their thresholds 40a, 40c, 40d and 40f, and an unacceptable number of symbol errors occurs. The other eight outer symbols will also be skewed with respect to their corresponding thresholds.

We have discovered that when the constellation thresholds are modified to take this phenomenon into account, a marked improvement in performance of the cellular modem 20 is possible.

Figure 2B:
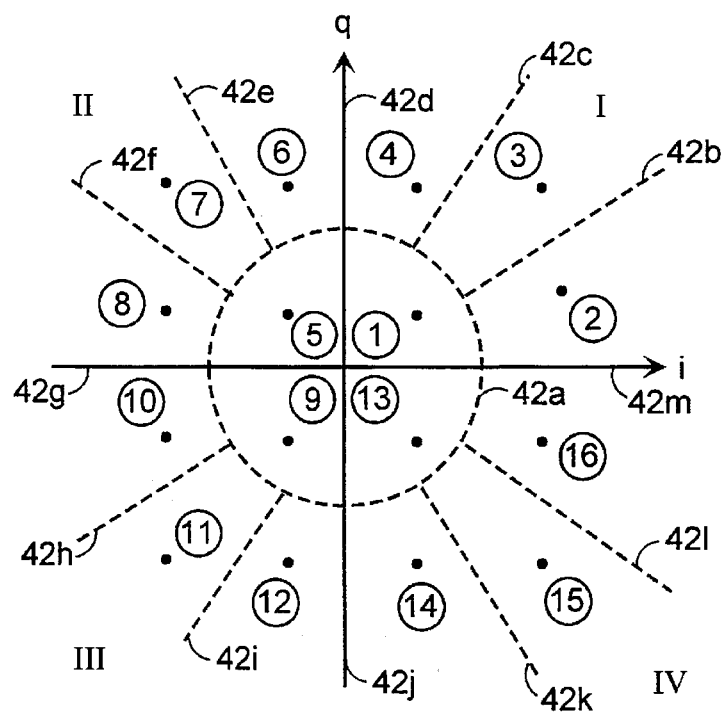
FIG. 2B shows the sixteen-symbol QAM constellation and a Euclidian distance detection scheme according to the invention.

In particular, as shown in FIG. 2B, a first threshold 42a is used which forms a circle about the center point (0,0) of the constellation. The magnitude of an incoming symbol is thus compared against this first threshold 42a to determine whether the symbol being received is one of the four innermost symbols {1}, {5}, {9}, or {13}, or one of the twelve outer symbols.

Additionally, twelve radial thresholds 42b–42m are positioned about the center point (0,0). The angular positions of these radial thresholds 42a–42m are selected to maximize the probability of correct detection, by splitting the Eucldian distance between adjacent outer symbols.

Four of these radial thresholds, namely 42d, 42g, 42j, and 42m, coincide with the $i$ and $q$ axes, and are also used to further discriminate between the four innermost symbols.

Because several magnitude and phase comparisons must be made, the input $i$ and $q$ information is preferably first converted from rectangular (Cartesian) notation to polar notation. This yields a sample magnitude which can be compared against the circular threshold 42a, and phase information which can be directly compared to the radial thresholds.

Figure 3:
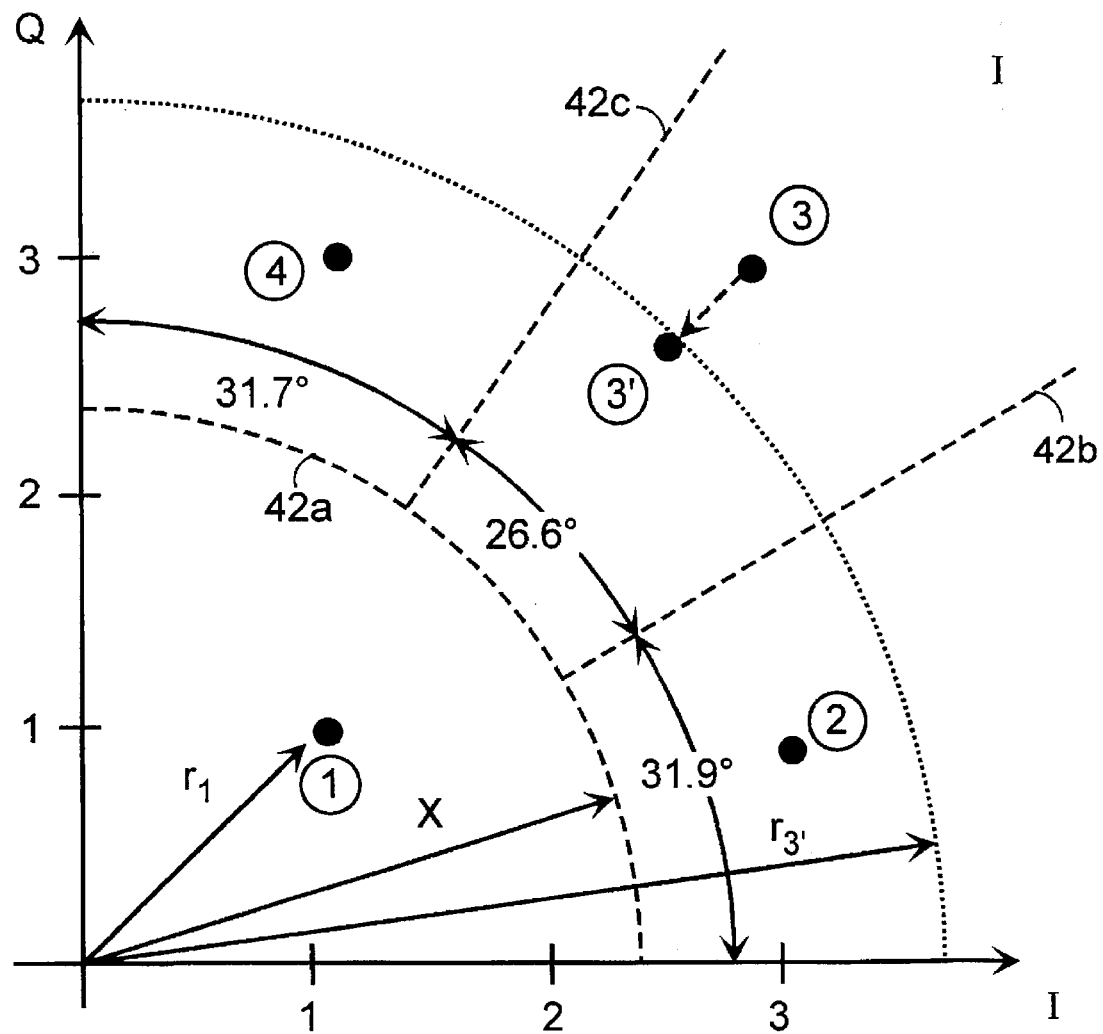
FIG. 3 is a detailed view of quadrant I of the constellation shown in FIG. 2B.

FIG. 3 is a more detailed view of quadrant I of the symbol constellation. Note that the circular threshold 42a determines whether a received signal sample has a magnitude less than a predetermined radius, X. The radius X is set to maximize the probability of discriminating between the innermost symbol {1} and the three outer symbols {2}, {3}, and {4}.

As such, radius X is preferably a variable which depends upon an estimated received signal variance. To set the value X, the cellular modem 20 periodically estimates the probability distribution function for the normalized magnitude of the outermost symbol {1}, for example, by determining an average sample magnitude and a variance for this average sample magnitude. These, in turn, are used to set the radius X such that the probability of correctly discriminating between the innermost and outermost symbols is maximized.

Figure 4:
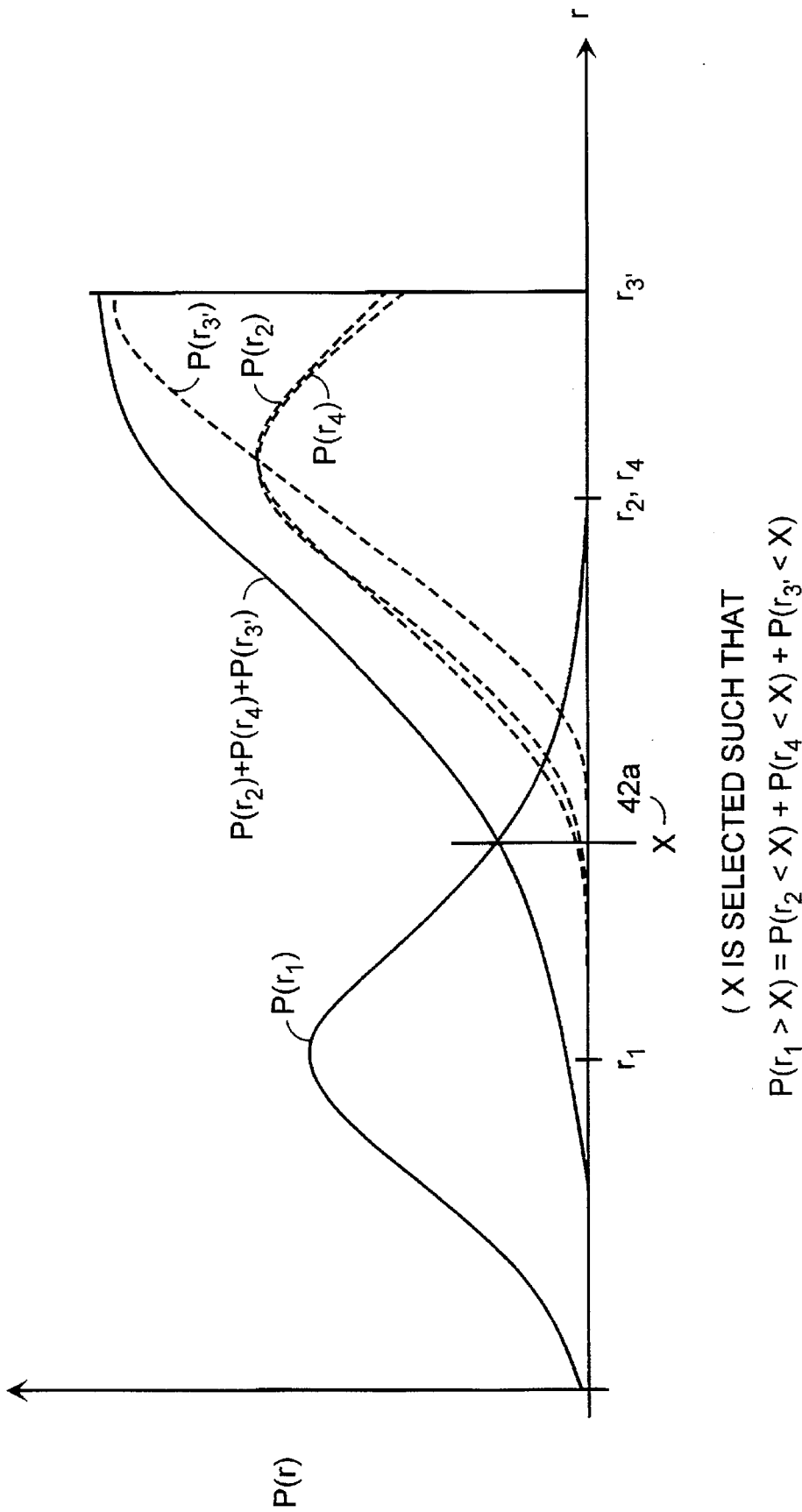
FIG. 4 plots the probability density functions for the four symbols in constellation quadrant I, showing how an optimum signal magnitude threshold may be selected.

The exact manner in which this is done may be better understood by referring to FIGS. 3 and 4 together. FIG. 4 is a plot of the probability distribution functions (PDFs) for each of the four symbols in quadrant I, which assumes that the expected symbol values are Gaussian-distributed. The expected magnitude for symbol {1} is depicted as $r_1$ in FIG. 3; the corresponding PDF for symbol {1} is the curve labelled $p(r_1)$ in FIG. 4. Similarly, the PDFs for symbols {2} and {4} are labelled $p(r_2)$ and $p(r_4)$. As to outermost symbol {3}, its expected distorted position is labelled as symbol {3'} and expected magnitude as $r_{3'}$ in FIG. 3; the curve labelled $p(r_{3'})$ is its PDF. The parameters of each of the PDF curves $p(r_1)$, $p(r_2)$, $p(r_{3'})$, and $p(r_4)$ may be found by determining an average and a variance of the corresponding received signal amplitudes when a sequence of known symbols is being received by the modem 20, such as during an initial training sequence.

The optimum decision radius, X, then, is selected such that $$p(r_1 > X) = p(r_2 < X) + p(r_4 < X) + p(r_{3'} < X),$$

thereby equalizing the probability of correctly detecting the innermost symbol {1} with the combined probabilities of correctly detecting the outer symbols {2}, {3} and {4}. In other words, the decision radius, X, is selected such that the probability of correct symbol detection is maximized by equalizing the probability that an inner-most symbol {1} within a given quadrant will be mistakenly identified as an outer symbol (i.e., {2} or {4}) to the probability that an outer symbol will be mistakenly identified as the inner-most symbol {1}.

This determination of the optimum radius, X, need only be made for one of the quadrants as the magnitudes of corresponding symbols in the other quadrants will be identical.

In contrast to the setting of the magnitude threshold, X, the phase angles of the radial thresholds 42b, 42c, and 42d are simply constants. As shown, they are positioned to split the angular distance between symbols {2}, {3}, and {4}. Thus, threshold 42b is at an angle of 31.7°, to discriminate between symbol {2} and symbol {3}, threshold 42c is set 26.6° higher, to discriminate between symbols {2} and {3}, and threshold 42d coincides with the vertical axis, to discriminate symbol {3} from symbol {4}.

The radial thresholds associated with quadrants II, III, and IV are similarly positioned, but have 90°, 180°, and 270° offsets, respectively.

The invention can thus be thought of as a cellular modem having a modified 16-QAM detector, wherein the constellation thresholds consist of a circle having a radius greater than the magnitude of the innermost symbols but less than the magnitude of the outermost symbols, and twelve radially spaced thresholds.

Figure 5:
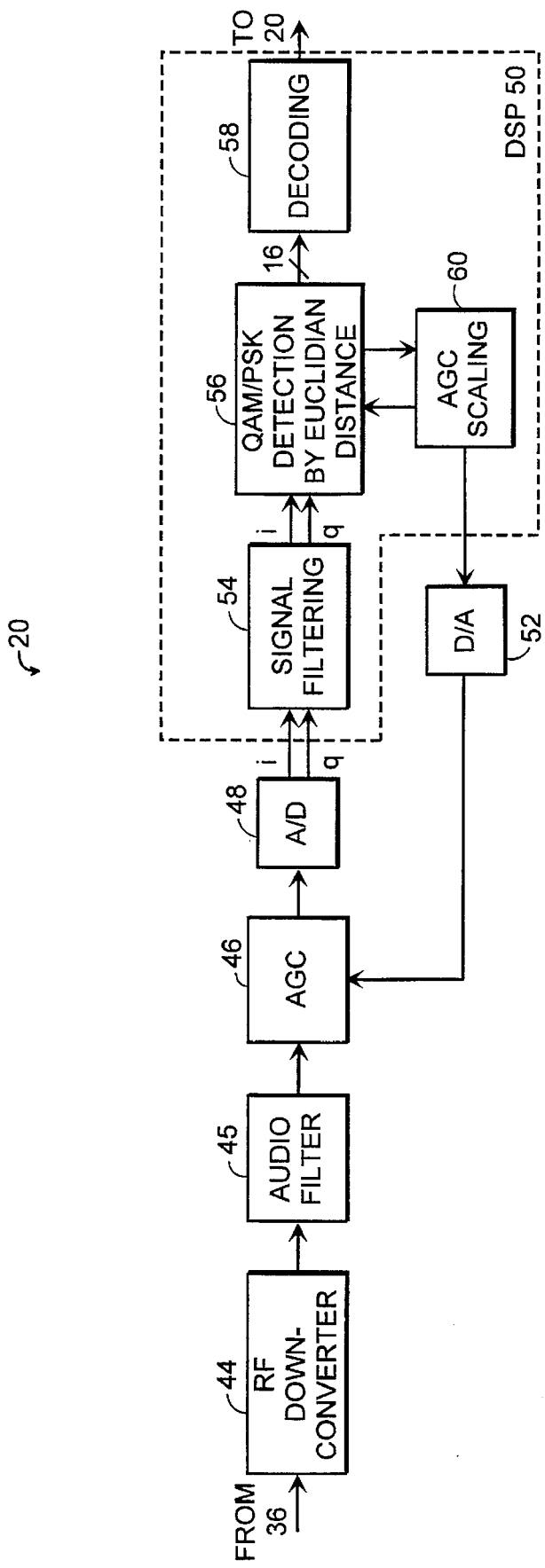
FIG. 5 is a block diagram of a cellular subscriber modem, showing the preferred hardware implementation of the symbol detector.

FIG. 5 depicts a detailed block diagram of one embodiment of the cellular modem 20. It includes a radio frequency (RF) down converter 44, an audio filter 45, an automatic gain control (AGC) circuit 46, an analog-to-digital (A/D) converter 48, a programmable digital signal processor 50, and a digital-to-analog (D/A) converter 52.

The RF down converter 44, audio filter 45, and AGC 46 operate as in any standard cellular telephone receiver, by respectively converting the incoming signal to baseband, filtering it, and then normalizing its amplitude.

The A/D converter 48 provides a representation of the incoming signal as $i$ and $q$ sample values to the digital signal processor 50. The $i$ and $q$ values can be first developed as analog voltages by a quadrature demodulator portion of the RF down converter 44, or may be developed by the A/D converter 48 directly. These $i$ and $q$ sampling techniques are well known in the art.

The digital signal processor 50 then performs standard modem functions on each $i$ and $q$ sample, including digital filtering 54, symbol decoding 58, and AGC scaling 60. The digital signal processor also performs the 16-QAM symbol detecting 56 function according to the invention, before the symbol decoding 58 takes place.

The digital filtering function 54 serves as an anti-aliasing filter, as is conventionally used after an A/D converter 48 converts an analog signal to digital samples.

The QAM detecting function 56 determines which one of the sixteen possible constellation symbols is presently being received, using the thresholding scheme of FIG. 2B according to the invention.

The decoding function 58 then further decodes this symbol information, placing it in suitable standard bit-serial or bit-parallel form to be sent to the portable computer 24.

The AGC scaling function 60 serves several purposes. While receiving the training sequence during an initialization procedure for each call, it determines an average symbol energy in a known manner, and sends a corresponding digital value to control the D/A converter 52 to set the AGC 46. This average signal level is then also used by the QAM detecting function 56, to determine a symbol variance, and to then set the circular threshold 42a, as has been described.

If the detecting function 56 is implemented as a software program associated with the digital signal processor 50, the hardware architecture of the cellular modem 20 can be identical to prior art cellular modems, permitting the use of readily available integrated circuit chips to implement the invention. FIGS. 6A and 6B are a structured English description of the steps performed by the digital signal processor 50 in performing the QAM detecting function 56 in such an instance.

In steps 100 to 120, during a training sequence, an average symbol energy level is read from the AGC scaling function 60, and the X value associated with the circular threshold 42a is calculated accordingly.

Steps 130 to 440 are then performed for each received sample.

In step 140, $i$ and $q$ values are read from the signal filtering function 54 for a current sample. For each sample, steps 150 and 160 then determine a phase and magnitude, respectively, by converting the $i$ and $q$ values from rectangular to polar notation.

In steps 170 to 200, a current constellation quadrant is determined by examining the current sample phase. If the sample phase is less than 90°, the sample is in quadrant I. If it is between 90° and 180°, the sample is in quadrant II. Similarly, the sample is in quadrant III if the phase is between 180° and 270°, and in quadrant IV if it is between 270° and 360°.

Steps 210 to 260 are performed if the sample is in quadrant I. In step 220, if the sample magnitude is less than X, then it is concluded that symbol {1} is currently being received.

Otherwise, steps 240 to 260 are performed to determine which one of the outermost symbols in quadrant I is being received. At step 240, if the sample phase is less than 31.7°, then symbol {2} is being received. At step 250, if the sample phase is between 31.7° and 58.3°, the received symbol is set to symbol {3}. Otherwise, in step 260, if the sample phase is between 58.3° and 90°, then symbol {4} has been received.

FIG. 6B shows steps 270 to 320, which are executed when quadrant II is the current quadrant. These steps are analogous to steps 210 through 250, with the exception of a 90° offset being added to the radial thresholds.

Steps 330 to 380 and 390 to 440 are analogous for quadrants III and IV, respectively.

Figure 7:
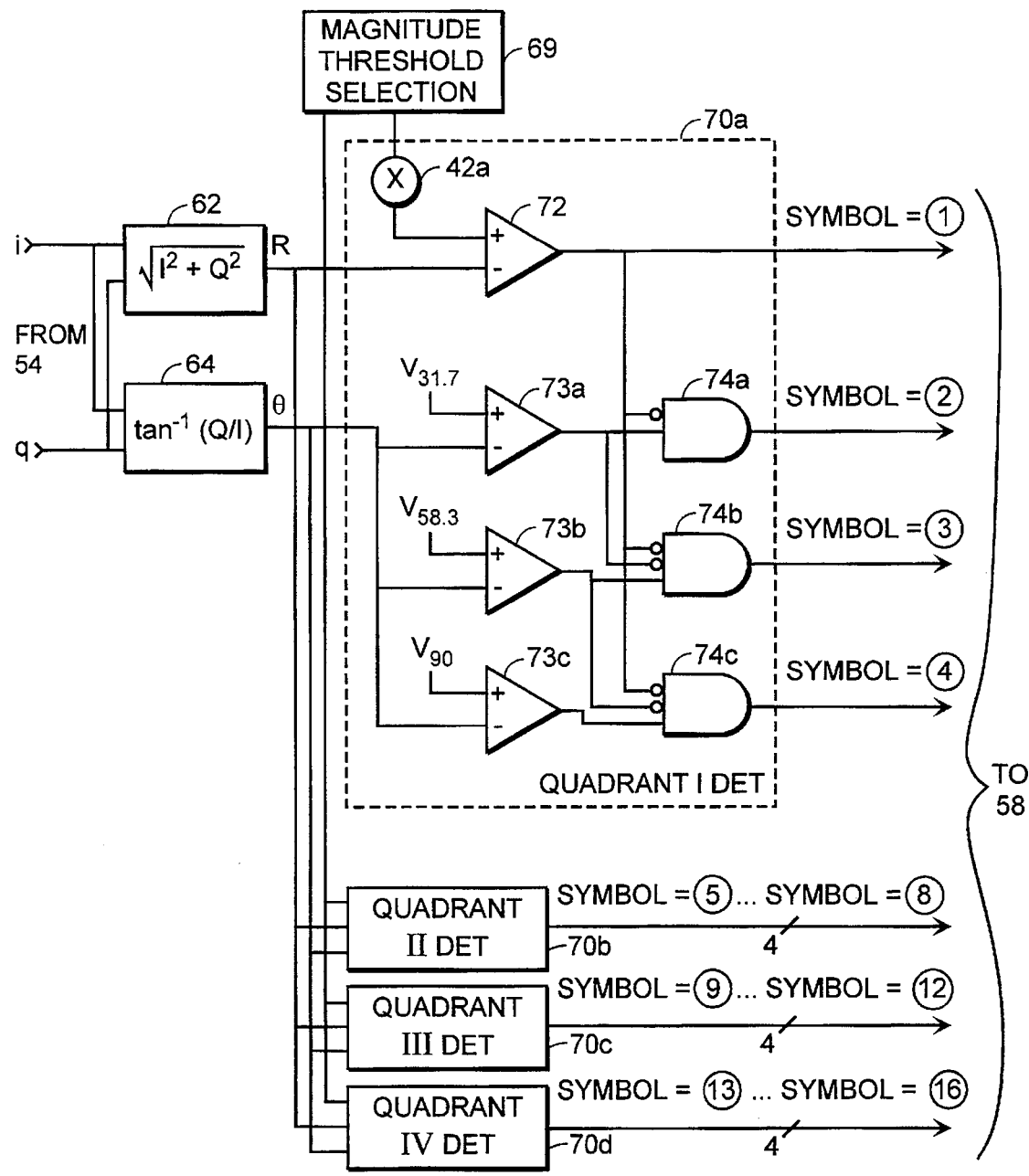
FIG. 7 is an alternative embodiment of the symbol detector using analog comparator circuits.

An analog circuit implementation of the inventive QAM detector is shown in FIG. 7. In this implementation, an analog voltage representing the current $i$ and $q$ sample are provided at the output of the AGC 46. A square root circuit 62 provides a magnitude voltage, R, which is proportional to the magnitude of the current sample. An inverse tangent circuit 64 provides a phase voltage, θ, which is proportional to the phase of the current sample. Such square root 62 and inverse tangent 64 circuits are well known in the art. The voltages R and θ are then provided to four quadrant detectors 70a–70d, with one quadrant detector being associated with each of the four quadrants I, II, III, and IV in the constellation.

An exemplary quadrant detector 70a, shown in detail, determines which of the symbols in quadrant I, if any, is being received. A first comparator 72 determines the difference between the sample magnitude voltage, R, and the voltage X which represents the circular threshold 42a. If R is less than X, then the comparator asserts a logic signal SYMBOL={1} to be true, thereby indicating that the current received symbol is symbol {1}.

Three other comparators 73a, 73b, and 73c perform the radial discrimination portion of the invention. Comparator 73a determines if the sample phase θ is less than a voltage $V_{31.7}$ which corresponds to an input phase of 31.7°. If this is true, and if the SYMBOL={1} signal is not true, then a SYMBOL={2} signal is asserted. Similarly, comparator 73b determines if the currently received symbol being is symbol {3}, by comparing the phase voltage θ to a voltage $V_{58.3}$ to see if it is less than a voltage that corresponds to an input phase of 58.3°. If this is true, and if the output of comparator 73a is false, a SYMBOL={3} signal is asserted. Likewise, comparator 73c determines if a SYMBOL={4} signal should be asserted, by comparing the phase voltage θ to a reference voltage $V_{90}$ that corresponds to a 90° phase input.

Quadrant II detector 70b is similar to quadrant I detector 70a, but uses comparator input voltages corresponding to the input phases of 121.7°, 148.3°, and 180°. The other quadrant detectors 70c and 70d are analogous, but of course use comparator input voltages corresponding to their respective phase comparison functions.

Figure 8:
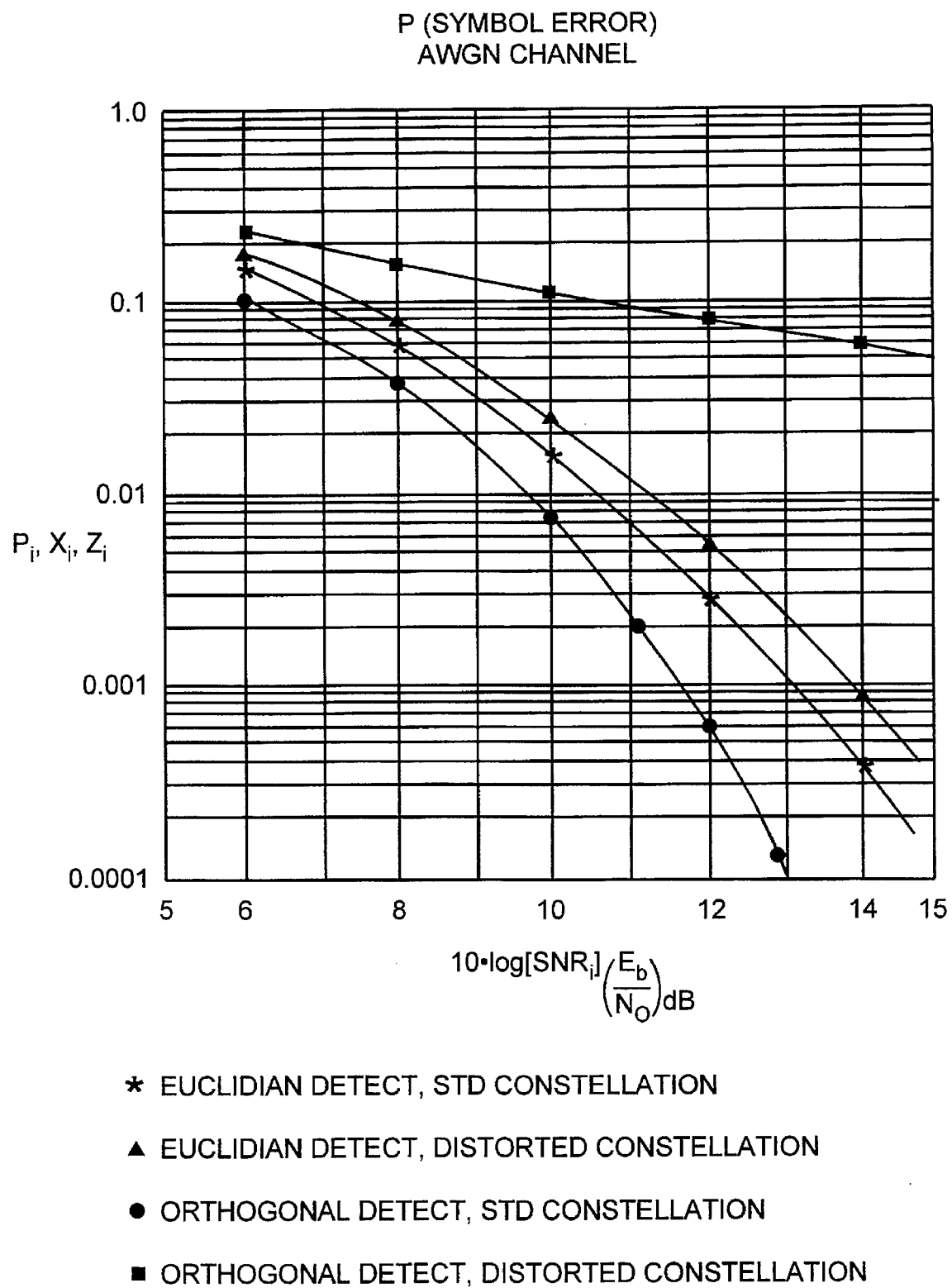
FIG. 8 is the result of a computer simulation of the symbol detector, and illustrates the improvement in signal-to-noise ratio at the detector output.

FIG. 8 is a logarithmic plot of output symbol error probability versus input signal to noise ratio, and is the result of a computer simulation of the implementation of the invention in FIGS. 6A and 6B. The simulation assumed that the added noise was Gaussian. A marked improvement in the symbol error rate of the inventive Euclidian distance symbol detector is evident, as compared to the performance of the prior art orthogonal Cartesian detector, in the case of base-station induced distortion.

It is also clear from FIG. 8 that while there is an implementation loss of approximately 1 dB for the undistorted case, the inventive detection scheme provides a many dB improvement in the distorted symbol case, with the improvement increasing as signal to noise ratio decreases.

The foregoing description has been limited to a specific embodiment of this invention. It will be apparent, however, that variations and modifications may be made to the invention, with the attainment of some or all of its advantages.

For example, although the invention has been described in connection with the CCITT V.22bis signalling scheme, other two-dimensional signalling schemes may benefit from the invention, as long they require discrimination between equally spaced symbols, and as long as the outermost symbols are subject to amplitude clipping or distortion of some type.

Furthermore, those of skill in the art will recognize that the invention may be implemented in different ways. For example, the steps of the flowcharts in FIGS. 6A and 6B may be performed in different orders, and/or combined with additional steps. For example, if it is important to obtain the absolute minimum bit error rate, the inventive Euclidian distance symbol detector may be combined with a prior art orthogonal Cartesian detector. The Euclidian distance detector is enabled when base-station induced distortion is evident, as indicated by the AGC scaling function 60, and the prior art orthogonal Cartesian detector is enabled when no distortion is evident.

Therefore, it is the object of the appended claims to cover all such variations and modifications as come within its true spirit and scope.

What is claimed is:

1. A cellular subscriber modem for receiving a quadrature amplitude modulated (QAM) signal, the QAM signal consisting of a plurality of symbols selected from a two-dimensional orthogonal signaling constellation which includes an innermost and a plurality of outer symbols within each of four quadrants, the modem comprising:

means for sampling a received cellular radio frequency (RF) signal containing the QAM signal, and for providing a pair of in-phase ($i$) and quadrature ($q$) received signal samples thereof;

means for determining a radial magnitude and a phase for each pair of $i$ and $q$ signal samples; and means for comparing the radial magnitude and the phase for each pair of $i$ and $q$ signal samples against magnitude and phase constellation threshold values to determine which one of the plurality of symbols is represented by each pair of $i$ and $q$ signal samples, wherein the means for comparing further comprises means for selecting the magnitude threshold value such that the probability of correct symbol detection is maximized by equalizing the probability that an inner-most symbol within a given quadrant will be mistakenly identified as an outer symbol to the probability that an outer symbol will be mistakenly identified as the inner-most symbol.

2. A modem as in claim 1 wherein the distribution of received symbols is characterized by statistical parameters, including average and variance, and the means for comparing further comprises: means for adjusting the magnitude threshold value in accordance with the average and variance of the received signal sample radial magnitudes.

3. A modem as in claim 1 wherein the means for comparing further comprises:

means for selecting the phase threshold value such that the probability of correct symbol detection is maximized by equalizing the probability of detecting each of the outer symbols within a given quadrant.

4. An apparatus as in claim 1 wherein:
   A. said means for sampling further comprises a quadrature sampling circuit, connected to receive the QAM signal and sample said signal to provide in-phase ($i$) and quadrature ($q$) signal values;
   B. said means for determining comprises
      B1. a magnitude detection circuit, connected to receive the $i$ and $q$ signal values, for providing a magnitude signal value proportional to the complex magnitude of the $i$ and $q$ samples; and
      B2. a phase detection circuit, connected to receive the $i$ and $q$ signal values for providing a phase signal value proportional to the complex phase of the $i$ and $q$ samples;
   C. said means for comparing further comprises
      C1. a magnitude comparator circuit, for comparing the magnitude signal value against a magnitude threshold values, providing a magnitude comparison signal value indicative of the comparison;
      C2. phase thresholding circuits, for comparing the phase signal value against a plurality of phase threshold values, to provide a plurality of phase comparison signal values indicative of the comparisons; and
      C3. symbol detection logic circuit, connected to receive the magnitude comparison signal value and the phase comparison signal values, and to provide logic signals indicating which of the plurality of symbols is being received.

5. A cellular subscriber modem that receives a cellular-compatible radio-frequency (RF) signal containing a voice-bandwidth quadrature amplitude modulated (QAM) data signal comprising of a plurality of symbols selected from a two-dimensional orthogonal signalling constellation which includes an innermost symbol and a plurality of outer symbols within each of four quadrants, and detects the symbol information in the QAM data signal to provide detected symbol information, the modem comprising:
   A. a radio frequency (RF) downconverter, connected to receive the cellular-compatible RF signal, and to provide a baseband cellular signal;
   B. an audio filter, connected to receive the baseband cellular signal, and to provide a filtered baseband signal;
   C. an automatic gain control (AGC) circuit, for receiving the filtered baseband signal, and to provide a gain-controlled baseband signal;
   D. an analog-to-digital converter, connected to receive the gain-controlled baseband signal, and to provide in-phase ($i$) and quadrature ($q$) samples thereof;
   E. a digital signal processor, connected to receive the $i$ and $q$ samples from the analog-to-digital converter, and to provide the detected symbol information, the digital signal processor comprising
      E1. digital signal filtering means, for receiving the $i$ and $q$ samples, and for providing filtered $i$ and $q$ samples;
      E2. QAM symbol detection means, for receiving the filtered $i$ and $q$ samples, and for providing the detected symbol information, the QAM symbol detection means further comprising
         sample phase means, for receiving the filtered $i$ and $q$ samples, and for determining a sample phase;
         sample magnitude means, for receiving the filtered $i$ and $q$ samples, and for determining a sample magnitude;
         means for selecting a magnitude threshold value such that the probability of correct symbol detection is maximized by equalizing the probability that an inner-most symbol within a given quadrant will be mistakenly identified as an outer symbol to the probability that an outer symbol will be mistakenly identified as the inner-most symbol;
         magnitude thresholding means, for comparing the sample magnitude against said magnitude threshold value, and for providing the detected symbol information; and
         phase thresholding means, for comparing the sample phase against a plurality of phase thresholds, and for providing additional detected symbol information.

6. A method of receiving a data signal, the data signal consisting of a plurality of symbols selected from a two-dimensional signalling constellation, wherein the magnitudes of the outer symbols are subject to clipping by transmission equipment, the method comprising the steps of:
   sampling the data signal, to provide a series of in-phase ($i$) and quadrature ($q$) signal samples thereof;
   determining a magnitude and a phase for each combination of $i$ and $q$ signal sample;
   comparing the sample magnitude and phase information against magnitude and phase threshold values respectively, to determine which one of the plurality of symbols is presently being received; and
   selecting said magnitude threshold value such that the probability of correct symbol detection is maximized by equalizing the probability that an inner-most symbol within a given quadrant will be mistakenly identified as an outer symbol to the probability that an outer symbol will be mistakenly identified as the inner-most symbol.

7. A method as in claim 6 further comprising the step of:
   selecting radially spaced phase threshold values such that the probability of detecting a particular one of the outer symbols in the given quadrant is equal to the probability of detecting any one of the other outer symbols in the given quadrant.

8. A method as in claim 6 further comprising the step of:
   receiving predetermined symbols during a training phase;
   determining a sample magnitude distribution of the symbols received during the training phase; and
   adjusting the magnitude threshold value in accordance with the sample magnitude distribution such that the probability of correct symbol detection is maximized by equalizing the probability that an inner-most symbol within a given quadrant will be mistakenly identified as an outer symbol to the probability that an outer symbol will be mistakenly identified as the inner-most symbol.

9. A cellular subscriber modem for receiving a quadrature amplitude modulated (QAM) signal consisting of a plurality of symbols selected from a two-dimensional orthogonal signalling constellation which includes an innermost symbol and a plurality of outer symbols within each of four quadrants, and for detecting which symbol within the orthogonal symbol constellation has been received, the modem comprising:
   means for sampling a received cellular radio frequency (RF) signal, and providing a series of in-phase ($i$) and quadrature ($q$) received signal samples thereof;
   means for determining a magnitude and a phase for each combination of $i$ and $q$ signal sample;
   means for comparing the magnitude and the phase for each combination of $i$ and $q$ signal sample against magnitude and phase constellation thresholds to determine which one of the plurality of symbols is presently being received, the means for comparing comprising:

means for selecting the magnitude threshold such that the probability of correct symbol detection is maximized by equalizing the probability that an inner-most symbol within a given quadrant will be mistakenly identified as an outer symbol to the probability that an outer symbol will be mistakenly identified as the inner-most symbol.

10. In a cellular subscriber modem for receiving a quadrature amplitude modulated (QAM) signal, means for detecting which symbols of an orthogonal symbol constellation are represented by a series of in-phase ($i$) and quadrature ($q$) signal sample pairs having Cartesian magnitudes, the symbols in each quadrant consisting of an innermost symbol and a plurality of outer symbols, the means for detecting comprising:

means for setting a radial magnitude threshold and phase thresholds;

means for converting $i$ and $q$ sample pair Cartesian magnitudes to magnitude and phase representations; and means for comparing sample magnitude and phase values to the magnitude and phase values set by the means for setting thresholds, the means for comparing determining which symbol of the orthogonal symbol constellation is represented by a particular $i$ and $q$ signal sample pair, the magnitude and phase values set such that the probability of correctly detecting the inner symbol is equal to the combined probabilities of correctly detecting any of the outer symbols.

11. The modem of claim 10, wherein the means for setting thresholds sets the radial magnitude thresholds such that the probability of mistakenly identifying an inner most symbol within a quadrant as an outer symbol is equal to the probability of mistakenly identifying an outer symbol as an inner-most symbol within a quadrant.

12. The modem of claim 11 wherein the means for setting thresholds uses the average and variance of a Gaussian distribution of radial magnitudes of symbols received during a training period to set the radial magnitude threshold.

13. The modem of claim 11 wherein the means for setting thresholds sets the radial magnitude threshold during a training sequence by setting the radial magnitude threshold to a predetermined value, receiving, in turn for each of the symbols within a quadrant, a statistically significant number of signals representative of a known symbol, using the radial magnitude threshold to determine which of the symbols is received, comparing the number of mistakenly identified inner-most symbols to the number of mistakenly identified outer symbols and, if these numbers are not approximately equal, adjusting the radial magnitude threshold so that they are.

14. The modem of claim 10 wherein the QAM signal is a sixteen symbol QAM signal compatible with the CCITT v.22 bis standard.

* * * * *